(12) United States Patent
Chenin et al.

(10) Patent No.: US 7,523,766 B2
(45) Date of Patent: Apr. 28, 2009

(54) REINFORCED SUBMARINE PIPELINE AND ASSEMBLY OF TWO COAXIAL PIPELINES COMPRISING SAME

(75) Inventors: Laurent Chenin, Le Mesnil Saint Denis (FR); Francois Régis Pionetti, La Baleine (FR); Alain Safakhah, Boulogne Billancourt (FR); Xavier Rocher, Chatou (FR)

(73) Assignee: Saipem S.A., Montigny LMEE Bretonneux (FR)

( * ) Notice: Subject to any disclaimer, the term of this patent is extended or adjusted under 35 U.S.C. 154(b) by 615 days.

(21) Appl. No.: 10/497,365

(22) PCT Filed: Nov. 28, 2002

(86) PCT No.: PCT/FR02/04080

§ 371 (c)(1),
(2), (4) Date: Jun. 3, 2004

(87) PCT Pub. No.: WO03/048621

PCT Pub. Date: Jun. 12, 2003

(65) Prior Publication Data

US 2005/0061382 A1 Mar. 24, 2005

(30) Foreign Application Priority Data

Dec. 4, 2001 (FR) .................... 01 15663

(51) Int. Cl.
*F16L 9/00* (2006.01)
(52) U.S. Cl. .................. 138/172; 138/173; 138/114; 138/121

(58) Field of Classification Search ............... 138/172, 138/173, 137, 140, 141, DIG. 1; 405/216, 405/195.1, 211.1; 114/243; 428/36.91
See application file for complete search history.

(56) References Cited

U.S. PATENT DOCUMENTS

| 436,463 | A | * | 9/1890 | Richard | .......................... 72/78 |
|---|---|---|---|---|---|
| 2,738,488 | A | * | 3/1956 | MacKnight | .................. 367/16 |
| 3,212,222 | A | * | 10/1965 | Wittfoht | .................. 52/223.14 |
| 3,454,051 | A | * | 7/1969 | Goepfert et al. | ............. 138/178 |
| 3,581,449 | A | * | 6/1971 | Huber et al. | .................... 52/84 |
| 3,731,711 | A | * | 5/1973 | Bauer | .......................... 138/178 |
| 3,884,173 | A | * | 5/1975 | Fabula | ......................... 114/243 |
| 4,321,950 | A | * | 3/1982 | Gaudel | ........................ 138/109 |
| 4,722,367 | A | * | 2/1988 | Swink et al. | ................. 138/178 |
| 6,019,549 | A | * | 2/2000 | Blair et al. | ................... 405/216 |
| 6,561,734 | B1 | * | 5/2003 | Allen et al. | .................. 405/216 |

* cited by examiner

Primary Examiner—Patrick F Brinson
(74) Attorney, Agent, or Firm—Cohen Pontani Lieberman & Pavane LLP

(57) ABSTRACT

The present invention relates to a reinforced undersea unit pipe element (1) suitable for being laid empty at great depth. The element includes a tubular wall, having at least one external peripheral reinforcing element (6, 7) creating a plurality of localized zones on the outside surface of the wall, the radial distance ($d_1$) between the outside surface of the pipe and the longitudinal axis (XX') of the wall in the zones being greater than the outside radius (R) of the tubular wall portions lying between the successive zones in the longitudinal direction (XX'), two successive ones of the zones being spaced apart in the longitudinal direction (XX') of the tubular wall by a distance (D) equal to ½ to 4 times the outside diameter (d) of the tubular wall portions, the successive zones preferably being spaced apart regularly.

22 Claims, 7 Drawing Sheets

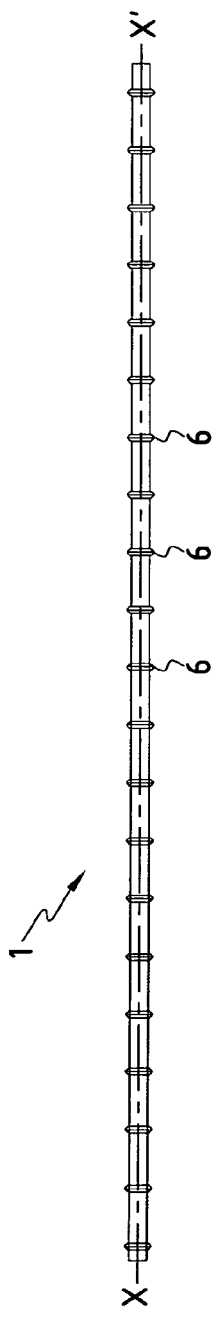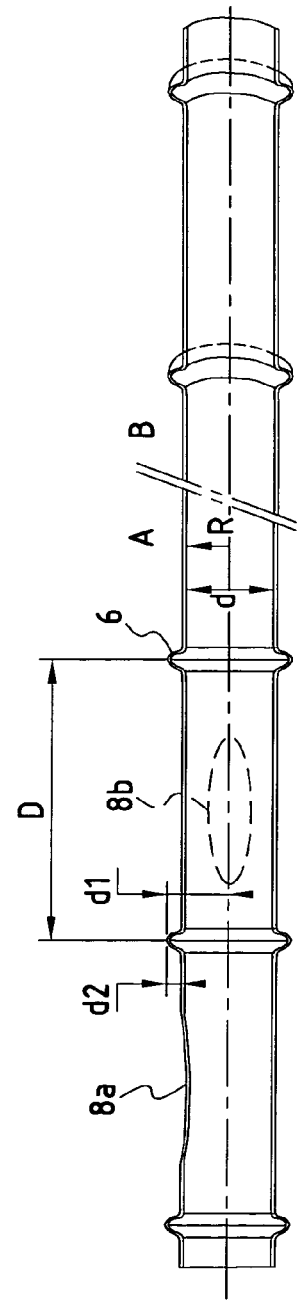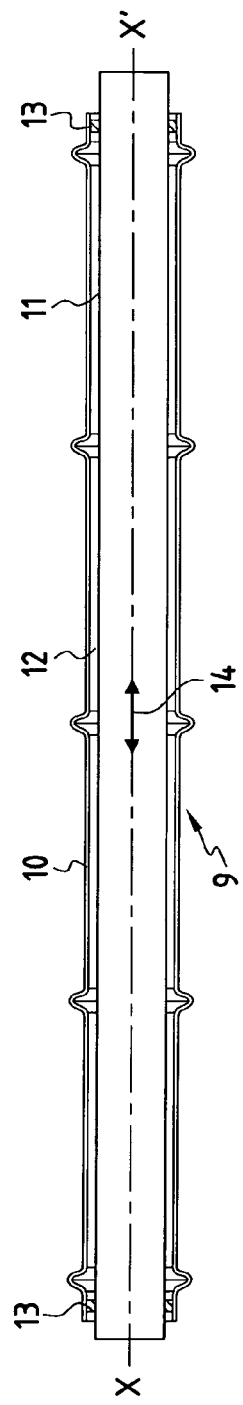

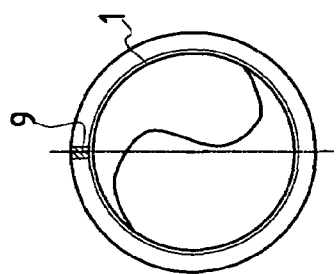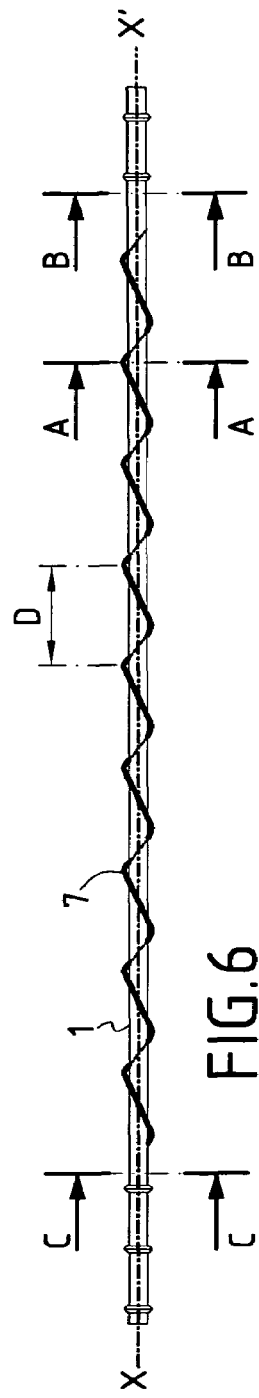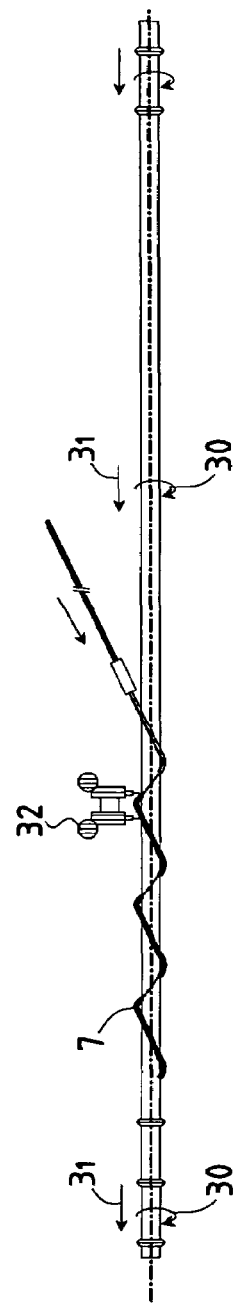

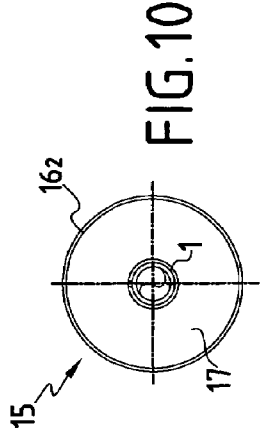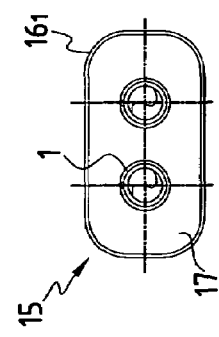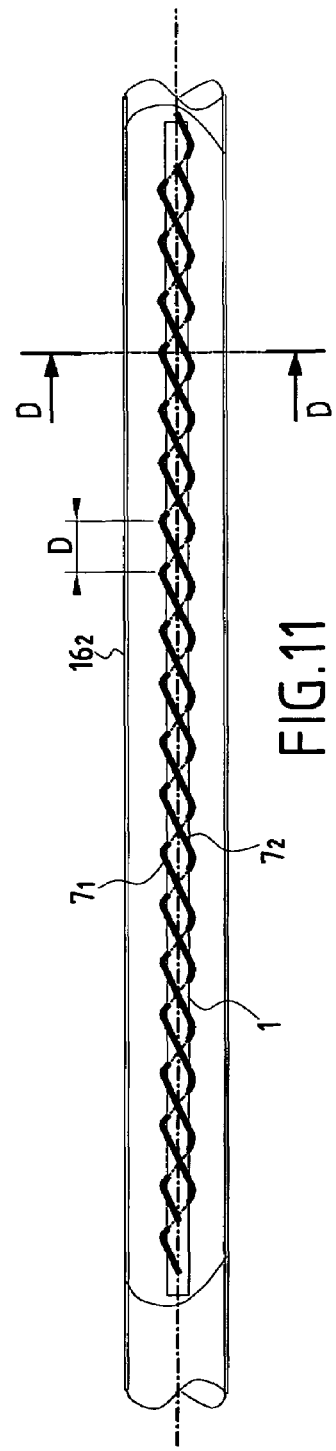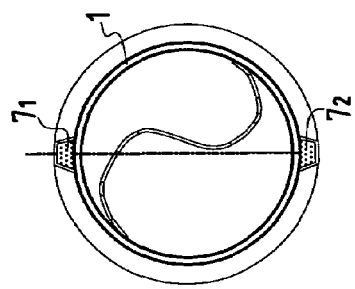

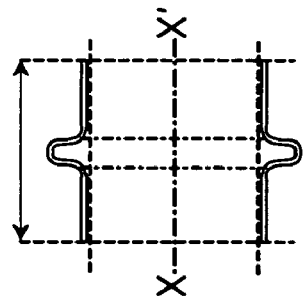
FIG.14
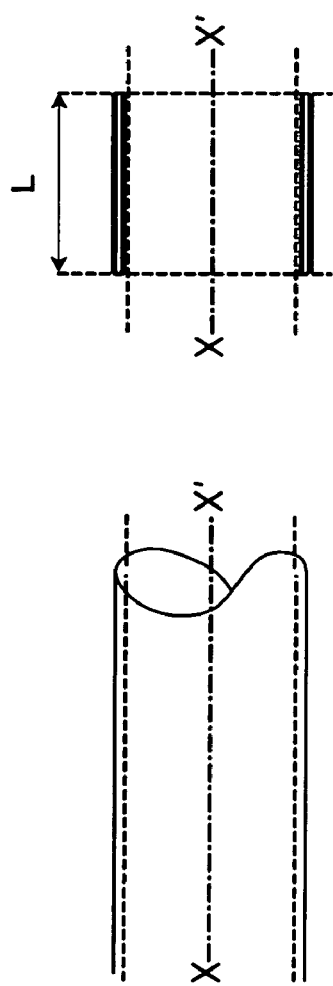
FIG.15
FIG.16
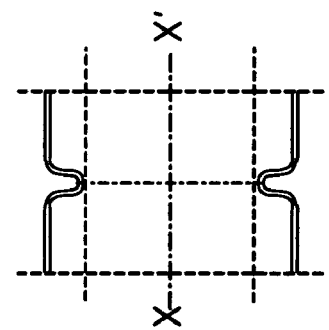
FIG.18
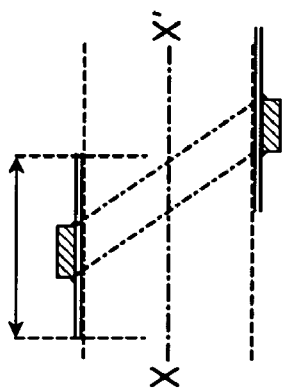
FIG.17

REINFORCED SUBMARINE PIPELINE AND ASSEMBLY OF TWO COAXIAL PIPELINES COMPRISING SAME

PRIORITY CLAIM

This is a U.S. national stage of application No. PCT/FR02/04080, filed on Nov. 28, 2002. Priority is claimed on that application and on the following application: Country: France, Application No.: 01/15663, Filed: Dec. 4, 2001.

BACKGROUND OF THE INVENTION

1. Field of the Invention

The present invention relates to undersea pipes, and more particularly to pipes suitable for being installed empty at great depth, in particular deeper than 1000 meters (m).

2. Description Of Related Art

The technical field of the invention is that of manufacturing and installing pipes for undersea operation of fields of oil, gas, or other material that is soluble or fusible or of a suspension of mineral material.

The present invention relates more particularly to pipes for use in ultra-great depths, i.e. 1000 m to 2000 m, or even 3000 m or more.

The invention also relates to the field of transporting gas by means of undersea pipes.

It relates more particularly to developing production fields installed at sea, off-shore. The main application of the invention is thus in the field of producing petroleum.

The present invention relates to the known field of connections of the undersea pipe type installed either on the sea bed or else rising towards the surface to an anchored floating support.

The production fields considered below in the present description are oil fields, and once the depth of an oil field becomes large, it is general practice to operate it from floating supports. Wellheads are often distributed over the entire field, and production pipes together with water injection lines and monitoring and control cables are placed on the sea bed leading to a fixed location, with the floating support being positioned on the surface vertically thereabove.

Pipes are generally laid from the surface using specialized barges and the so-called "S" technique providing the depth of water is not too great, e.g. 300 m to 500 m, or the so-called "J" technique when the water is deeper. The terms "S" and "J" come from the appearance of the curve taken up by the pipe between the laying barge and the bottom, which curve is respectively S-shaped or J-shaped.

While it is being installed, the pipe is laid empty so as to take advantage of the additional support provided by buoyancy thrust, thereby considerably reducing the tension that is required at the barge in order to hold the pipe that is being assembled.

Thus, when the pipe rests on the bottom, because it is empty and in direct communication with the surface, its inside pressure corresponds substantially to atmospheric pressure, whereas its outside pressure corresponds to the pressure at the bottom of the sea, i.e. a pressure of approximately 10 bars per 100 m of depth.

Thus, the pipe must be capable of withstanding a bottom pressure of about 150 bars at a depth of 1500 m and of about 350 bars at a depth of 3500 m. This pressure tends to cause the pipe to implode, with such implosion taking place suddenly once the limit pressure has been exceeded.

It would be possible to lay the pipe while full in order to avoid the above drawback, however the tension needed at the head of the pipe would then rapidly become excessive, and in the case of oil production, because gas can come from an oil well, such arrivals of gas would run the risk of completely filling considerable lengths of pipe, which would return to the same problem as above whenever the pipe is depressurized at the surface.

For shallow or medium depths, pipes are thus generally dimensioned to withstand an internal pressure in service and their implosion behavior is verified so as to avoid future incidents. However, at great depths and ultra-great depths, the non-implosion criterion becomes predominant and pipes have to be dimensioned relative to this criterion.

While laying pipes in an S-shape or a J-shape, whenever the position of the vessel is unstable, the resulting deformation in the S- or J-shaped curve runs the risk of leading to an unacceptable increase in the curvature of the pipe, and that can degenerate into the pipe buckling locally or "kinking". Buckling degenerates almost instantly into implosion of the pipe. The implosion propagates very quickly to all of that portion of the pipe which is in suspension, and also to all of the pipe which is laid on the sea bottom. This phenomenon can be avoided by increasing the wall thickness of the pipe or by using higher-performance steel, but increasing the quantity of material used has the effect not only of increasing the cost of the pipe, but also of increasing the tension needed for laying it.

Because it is desirable to optimize overall cost, it is preferred to install localized reinforcement referred to as "buckle" arrestors at regular intervals, i.e. to install anti-implosion rings having the function of preventing an implosion initiated at a localized buckle from propagating. These anti-implosion rings are generally localized portions of the pipe having extra wall thickness, these portions occupying a length of 30 centimeters (cm) to 1 m, and being distributed every 200 m along the entire pipe, for example. Thus, in the event of an incident occurring during laying, the implosion is restricted to the portion that extends between two rings. The pipe can then be raised until the damaged zone is reached, the damaged zone removed, and laying continued.

In certain fields, pipes need to be insulated so that the petroleum effluent reaches the surface at a temperature higher than some minimum temperature in order to avoid the viscosity of the crude oil increasing and also in order to avoid paraffins or hydrates forming. It is thus desirable to avoid the temperature of the crude oil dropping to below 30° C.-40° C. prior to reaching the surface. Because sea water at great depth is at a temperature of about 4° C., numerous very high performance insulation systems have been developed in order to achieve this objective, and above all in order to maintain the temperature of the crude in the event of production being interrupted in untimely manner. It is very difficult to restart an installation in the event of a localized obstruction, and restarting is even more difficult if the obstruction has become generalized.

Amongst the techniques used for performing the insulation function, some are known as pipe-in-pipe or "PiP". This involves an inner pipe conveying the hot fluid being installed inside an outer protection pipe, with the space between the two pipes being either merely evacuated or else filled with lagging, optionally confined in a vacuum. PCT/FR00/03200 describes that type of assembly comprising a coaxial pipe with an outer pipe containing an inner pipe, with the pipes being interconnected by centralizing mechanical links, and with the space between said inner and outer pipes preferably containing an insulating material.

In that type of pipe, the fact of the space between the pipes being either evacuated or else under substantially atmospheric pressure requires the inner pipe to be dimensioned mainly in order to withstanding bursting at service pressure, while the outer pipe is dimensioned mainly to be able to withstand implosion at bottom pressure.

In PiPs, the inner pipe is at the same temperature as the fluid, i.e. at high temperature, whereas the outer pipe is at sea bottom temperature, i.e. about 4° C. This gives rise to differential expansion between the inner pipe and the outer pipe, and that can generate considerable forces, possibly as great as several tens or even several hundreds of (metric) tonnes (t) which then act on the ends and which must be contained by rugged connection structures capable of preventing one of the pipes moving axially in unwanted manner relative to the other. These phenomena of bottom pressure and differential expansion are known to the person skilled in the art in the field of oil production, and they are not developed in greater detail herein.

U.S. Pat. No. 4,261,671 proposes making multiple corrugations that are regular and close together, in a circular or a spiral configuration in order to increase the ability of a pipe to withstand pressure. Those multiple corrugations comprise symmetrical or complementary shapes and backing shapes following one another in continuous manner. Such corrugated or spiral shaping is generally performed by hydraulically expanding a tubular wall from the inside, and it is very difficult to perform, particularly on pipes of considerable wall thickness.

Given that the corrugations follow one another continuously and are therefore very close together, it is necessary to insert a coating inside the pipe in order to smooth the inside surface of its wall, thus serving to fill in the too numerous recesses that otherwise run the risk of disturbing fluid flow within the pipe.

French patent No. 2 781 034 describes a lightweight pipe that is insulated and mechanically reinforced, using a corrugated outer pipe resting on inner tubing, with lagging then filling the voids. Such a pipe then presents considerable thermal bridges because of the contact between the inner and outer pipes, and furthermore, since it is made out of lightweight materials, it is incapable of performing the functions expected of a pipe that is for use in ultra-great depths at sea.

French patent No. 2 808 864 describes a pipe having improved resistance to buckling in which successive necks are made that are spaced apart from one another at a distance of 0.25 to 3 times the diameter of the tubular wall, and that are thus in smaller numbers than the corrugations in the embodiments of U.S. Pat. No. 4,261,671. Nevertheless, the necks are obtained by hollow forming of the stamping type from the outside, and the inside diameter of the pipe is correspondingly narrowed. In that type of pipe, since the diameter of the tubular portion of the pipe is greater than the flow passage through the necks, in order to withstand a given pressure it is necessary for wall thickness to be greater than for the version described in the preceding patent, in order to obtain the same inside flow diameter available to the fluid inside the pipe.

In both U.S. Pat. No. 4,261,671 and FR 2 808 864, making corrugations or necks in regular manner all along the pipe is very difficult if it is also desired to conserve a pipe that is rectilinear and of inside diameter that is substantially constant.

SUMMARY OF THE INVENTION

The problem thus posed in the present invention is that of providing an improved reinforced undersea pipe which withstands implosion while being laid empty at great depth, and also while in service resting on the sea bottom and subjected to bottom pressure, which pipe must additionally and above all be easier and less expensive to make industrially than in the prior art.

Another object of the present invention is to provide a reinforced undersea pipe that withstands buckling and implosion, and that is as light as possible in weight so as to be capable of being laid on the sea bottom by means involving small mechanical tension.

Another object of the present invention is to provide an undersea pipe of the PiP type in which the outer pipe accommodates axial expansion movements of the inner pipe to which it is connected, while nevertheless being reinforced so as to withstand implosion.

To do this, the present invention provides a reinforced undersea unit pipe element suitable for being laid empty at great depth, and in particular at depths in excess of 1000 m, the element comprising a tubular wall. Said wall comprises at least one external peripheral reinforcing element creating a plurality of localized zones on the outside surface of said wall, the radial distance between the outside surface of the pipe and the longitudinal axis of said wall in said zones being greater than the outside radius of the tubular wall portions lying between said successive zones in said longitudinal direction, two successive ones of said zones being spaced apart in said longitudinal direction of said tubular wall by a distance equal to ½ to 4 times and preferably 1 to 3 times the outside diameter of said tubular wall portions, said successive zones preferably being spaced apart regularly.

The term "undersea unit pipe element" is used herein to mean either a continuous undersea pipe or else a discontinuous element, particularly an element of length lying in the range 5 m to 50 m and designed to be connected end to end with other elements to make up such an undersea pipe.

The reinforced pipe of the present invention makes it possible to prevent said pipe imploding by resorting to dimensional modifications of said pipe, either by deforming its wall, or by having recourse to fitting reinforcing elements, as explained below. Said modifications are small in number, as in FR 2 808 864, but they are more effective since they increase the second moment of area of the cross-section of the pipe where the modifications are made and since they also make it possible to make pipes of lighter weight for given internal flow diameter available to the fluid inside the pipe, as explained in the detailed description below.

It will be understood that said external peripheral reinforcing elements are elements extending over the outside surface constituting said wall.

More particularly, said wall comprises:
said reinforcing elements that are discontinuous such that said zones in a given longitudinal direction are created by distinct discontinuous reinforcing elements; and/or
reinforcing elements that are continuous such that each continuous reinforcing element comprises at least two of said zones in a given longitudinal direction.

Each said continuous reinforcing element can form a curve that is open or closed. In contrast, such a continuous reinforcing element preferably forms a curve that is open.

The spacing of said successive zones at a distance lying in the range ½ to 4 times the diameter of the wall is justified in that each said reinforcing element stabilizes said pipe in the vicinity of said zone and on either side of said zone over a distance lying in the range ¼ to 2 times the diameter of said wall in its tubular portion.

In a particular embodiment, the increase in said radial distance between the outside surface of the pipe and the longitudinal axis of said wall is equal to ½ to 5 times and preferably 1 to 3 times the thickness of said tubular wall in its running portion.

In a first variant embodiment, said wall comprises a plurality of annular discontinuous reinforcing elements each forming one of said zones corresponding to an increase of the outside diameter of said pipe at said annular reinforcing elements.

In a second variant embodiment, said wall comprises at least one continuous helical reinforcing element forming at least a portion of a helical curve having the same longitudinal axis as said tubular wall.

In an embodiment, the wall comprises a plurality of discontinuous helical reinforcing elements, a plurality of localized zones on a common generator line of the running portion of the tubular wall belonging to separate helical reinforcing elements.

In another embodiment, the wall comprises a single said continuous helical reinforcing element which extends over the outside surface of said wall, constituting a plurality of turns. Said continuous helical element then comprises a plurality of successive said localized zones in the same longitudinal direction that are spaced apart by a distance corresponding to the pitch of said helix.

In a preferred embodiment of said second variant, said wall comprises a plurality of said coaxial helical reinforcing elements that are mutually parallel, preferably two to four of said parallel helical reinforcing elements, more preferably at least two continuous helical reinforcing elements such that they constitute respective ones of said zones that are diametrically opposite about the axis of said wall, respectively on each of said two helical elements.

It will be understood that the pitch of said helices are such that two successive ones of said zones facing the same generator line belong to distinct helices and are spaced apart in said longitudinal direction by a distance D lying in the range ½ to 4 times, preferably 1 to 3 times the outside diameter of said running portion of the tubular wall.

In an advantageous embodiment, each of said localized zones corresponds to an increase in said radial distance from said longitudinal axis XX' and extends in said longitudinal direction over a length lying in the range 2 to 10 times the thickness of the wall in its tubular portions. Where appropriate, this length of 2 to 10 times the thickness corresponds to a said deformation having a radius of curvature lying in the range 1 to 5 times the thickness of said wall.

In a first embodiment of each of said two above-mentioned variants of reinforcing elements, said reinforcing elements are constituted by section members applied to the outside surface of said wall so as to create extra thickness for said wall in said zones.

More particularly, said section members are preferably metal section members welded to the outside surface of a said metal tubular wall, and preferably members having a section that is rectangular or trapezoidal. Said section members may alternatively be composite material sections preferably stuck to the outside surface of a said tubular wall made of metal or of composite material, and preferably members having a section that is rectangular or trapezoidal.

When said section member is made of metal, it may be made separately and then welded or stuck to the wall, or it may be made in situ on the wall by directly applying metal, in a defined shape.

In a second embodiment of said two variants of said reinforcing elements, said reinforcing elements are made by deforming said metal wall by embossing it.

It will be understood that the embossing corresponds to causing the wall to project outwards and that the wall thickness of the pipe is not significantly modified by the deformation.

More particularly, said deformation is implemented by forging the metal wall from the inside of said pipe.

Said first embodiment is particularly advantageous since it does not present any deformation to the inside diameter of the wall, which wall remains smooth, therefore not disturbing the flow of fluid inside the pipe. Furthermore, this first embodiment is easier to implement industrially than making deformations by embossing said wall.

In a preferred embodiment of the invention, the reinforced undersea unit pipe element comprises:
at least one said continuous helical reinforcing element in its central portion; and
at least one and preferably 2 to 10 annular reinforcing elements that is/are discontinuous situated between at least one end of said unit pipe element and said continuous helical reinforcing element(s).

In a particular embodiment,
the or each annular reinforcing element is made by deforming said wall by forging it; and
the or each continuous helical reinforcing element is a section member fitted to the surface of said wall, and preferably bonded thereto by welding or by adhesive.

In an advantageous variant, the undersea unit pipe element of the present invention comprises: a said continuous helical reinforcing element causes at least one end, and preferably both ends, to terminate in a said discontinuous annular reinforcing element, preferably made continuously with said helical reinforcing element.

Still more particularly, the unit undersea pipe element of the invention comprises a said continuous helical reinforcing element constituted by a section member fitted to the surface of said wall and causing at least one end, and preferably both ends, to terminate in an annular reinforcing element extending continuously from said helical reinforcing element, said annular reinforcing element being constituted by the end of said section member constituting said helical reinforcing element.

The present invention also provides a reinforced undersea pipe made by connecting end to end, in particular by welding, a plurality of unit pipe elements comprising at least one unit pipe element.

The present invention also provides a coaxial assembly of two pipes comprising an outer pipe containing an inner pipe, the pipes being interconnected by centralizing mechanical connections preferably constituted by pieces of plastics material, more preferably of elastomer material, the space between said inner and outer pipes preferably containing an insulating material, and said outer pipe comprises at least one reinforced unit pipe element or pipe of the invention.

Preferably, the present invention provides an assembly of two pipes in which said outer pipe comprises at least one said reinforced unit pipe element comprising:
at least one said helical reinforcing element that is continuous in its central portion, with said continuous helical reinforcing element(s) preferably being section member(s) applied to the surface of said wall; and
at least one and preferably 2 to 10 annular reinforcing element(s) that is/are discontinuous between at least one of the ends of said unit pipe element and said continuous helical reinforcing element(s).

More preferably:
said annular reinforcing element(s) is/are made by deforming said wall by internal forging; and said continuous helical reinforcing element(s) is/are section members applied to the surface of said wall, and preferably bonded thereto by welding or adhesive.

As explained in the detailed description below, coaxial assemblies of this type are particularly advantageous since they combine the following two technical effects:

resistance to implosion and buckling; and tolerance to differential expansion between the inner and outer pipes when they are in service.

The present invention also provides a bundle of pipes constituted by a device for thermally insulating an undersea pipe, comprising:

a thermally insulating covering surrounding said undersea pipe(s); and said covering itself being covered in a protective leakproof casing, said casing being tubular in shape and presenting a longitudinal axis of symmetry and being preferably constituted by a material that is flexible or semi-rigid and suitable for remaining in contact with the outside surface of said insulating covering when it deforms.

Said undersea pipe(s) contained in said pipe bundle comprise reinforced unit pipe elements or coaxial assemblies of two pipes of the invention.

BRIEF DESCRIPTION OF THE DRAWINGS

Other characteristics and advantages of the present invention appear better on reading the following description made in non-limiting and illustrative manner with reference to the accompanying drawings, in which:

FIG. 2 is a side view of a portion of pipe fitted with a plurality of regularly spaced-apart circular reinforcements;

FIG. 3 shows, at A, the longitudinal section in side view of the FIG. 2 pipe, and at B, a perspective view also relating to FIG. 2;

FIG. 5 is an exploded side view in longitudinal axial section of the outer casing 1a of a pipe-in-pipe associated with a side view of the inner pipe 1b of said pipe-in-pipe;

FIGS. 6 and 7 are side views of a portion of pipe fitted at its ends with circular reinforcements 6 and in its running portion with a continuous length of helical reinforcement 7;

FIG. 8 is a cross-section view on plane AA of FIG. 6;

FIGS. 9 and 10 are cross-section views of a bundle of pipes, showing respectively a two-pipe bundle and a one-pipe bundle;

FIG. 11 is a longitudinal section view of the outer casing of a bundle, associated with a side view of the inner pipe reinforced by a dual spiral;

FIG. 12 is a cross-section view on plane BB on FIG. 10;

FIG. 14 is a side view of a thick pipe capable on its own of withstanding bottom pressure;

FIGS. 15 to 18 are side views in section of thick-walled pipes and of pipes having walls of reduced thickness showing various ways of providing localized reinforcement.

DETAILED DESCRIPTION OF THE PREFERRED EMBODIMENTS

Figure 1:
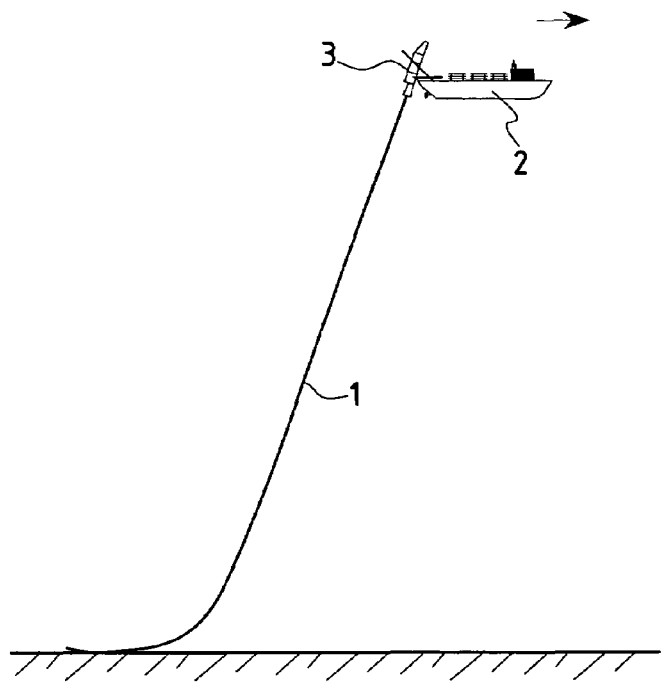
FIG. 1 is a diagrammatic side view of a pipe being laid in a J-shape in great depths from a ship.

FIG. 1 is a diagrammatic side view of a pipe 1 being laid in a J-shape in great depth from a ship 2 fitted with a tower 3 for laying undersea pipes. The pipe is generally laid while empty in order to minimize the tension at the head of the pipe as explained above, and as a result its inside pressure is substantially identical to atmospheric pressure.

FIG. 2 is a side view of a portion of pipe 1 fitted with annular discontinuous reinforcing elements 6 referred to below as "hoops". Said reinforcing elements are spaced apart in regular manner (D) and they are constituted either by section elements that are applied on and welded to the surface of said pipe, or by elements that are the result of forging the wall from inside said pipe. Each of these discontinuous annular reinforcing elements defines a localized zone on the outside surface of the pipe in which the radial distance $d_1$ between the outside surface of the pipe and the longitudinal axis XX' of the wall is greater than the outside radius R of the portions of tubular wall between two successive ones of said zones in the longitudinal direction XX'. The annular reinforcing elements 6 are spaced apart at a distance D which is 2 to 3 times the outside diameter d of said tubular wall portions constituting the running portion of the wall.

The increase in said radial distance $d_2$ between the outside surface of the pipe and the longitudinal axis XX' of said wall is equal to 3 to 4 times the thickness of said tubular wall in its running portion.

The left-hand side (A) of FIG. 3 is a side view in longitudinal section of the pipe 1 where the hoops 6 obtained by hot-forging from the inside are shown in detail, and the right-hand portion (B) of FIG. 3 is a perspective view of said forged hoops 6. The thickness of the wall in the annular reinforcing elements obtained by forging the wall is substantially identical to the wall thickness of the remainder of the pipe. These forged hoops 6 create variations in the diameter of the pipe, locally increasing the second moment of area of the wall, thereby increasing the ability of the pipe to withstand buckling which is what initiates implosion.

Figure 4:
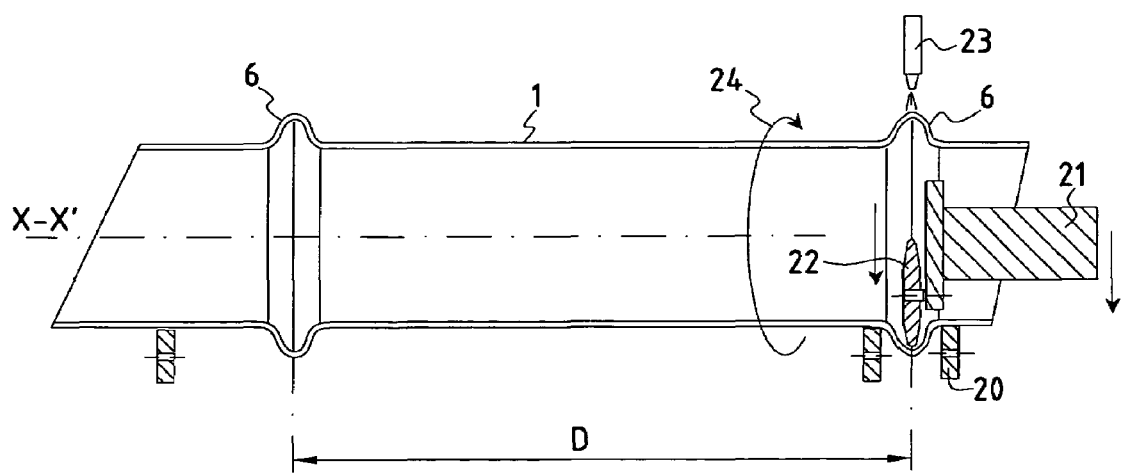
FIG. 4 is a side view in section of a pipe showing a forming tool having a single wheel that is hot-forging reinforcement by expanding the pipe outwards.

FIG. 4 is a side view in section of a pipe of the invention showing annular reinforcing elements obtained by deforming the pipe wall by forging it from the inside of the pipe, and the figure shows the means used in the method of obtaining such annular reinforcing elements 6. The pipe 1 is supported on rollers 2 and is set into rotation 24 by means that are not shown. A tool carrier 21 held from outside the pipe 1 is secured to a forming wheel 22. The assembly is pressed strongly against the wall of said pipe. Said wheel 22 rolls on the rotating pipe and thus forms the annular reinforcing element 6 after a few revolutions. In order to minimize the forces required for forging purposes, it is advantageous to heat said pipe locally, preferably over a width corresponding to the portion that is to be deformed, for example using an oxyacetylene torch 23. When the wheel 22 has finished its radial stroke, the annular reinforcing element 6 is made, and the wheel 22 is then returned towards the axis of the pipe XX' so as to release it. Then, the pipe 1 is moved through a distance D so as to forge the following annular reinforcing element.

FIG. 5 shows an assembly comprising two coaxial pipes in a pipe-in-pipe configuration comprising an outer pipe 10 containing an inner pipe 11, the pipes being interconnected by centralizing mechanical connections 13 which are preferably constituted by pieces made of a plastics material, and more preferably of elastomer. The space 12 between said inner and outer pipes 10 and 11 preferably contains an insulating material. The inner pipe 11 may be subjected to a bursting pressure while the outer pipe 10 is subjected to the external pressure tending to cause it to implode. The centralizers 13 hold the outer and inner pipes 10 and 11 spaced apart in concentric manner. The centralizers 13 are installed in conventional manner at regular intervals along the pipe, for example once every 12 m. Some of the centralizers 13, referred to as "reinforced connection centralizers" hold the inner and outer pipes 11 and 12 together in rigid manner and at appropriate spacing so as to create localized sealing for isolating successive segments from one another. These reinforced connection centralizers are spaced apart more widely, for example one every 200 m. This insulation system keeps the crude oil traveling inside the pipe at a high temperature even though the bottom of the sea is at a temperature of about 4° C. As a result there arise phenomena of differential expansion 14 between the hot inner pipe 11 and the cold outer casing 10. With a prior art outer casing 10, said differential expansion phenomena produce axial forces at said reinforced connection centralizers 13 which can amount to several hundred tonnes. Said reinforced connection centralizers 13 therefore need to be extremely strong and they create considerable thermal bridges between the lagged zone 12 and the outside of the pipe which is at a temperature of about 4° C. The annular reinforcing elements obtained in the present invention by deforming the wall of the pipe from the inside by forging serve not only to improve implosion behavior, but they also have the effect of imparting longitudinal flexibility to the outer casing 10 because of the zigzag curves that are created at said annular reinforcing elements, thus enabling the outer casing to lengthen under the effect of the expansion of the inner pipe 11, which considerably reduces the forces that are generated on the reinforced centralizers 13.

FIG. 6 is a side view of a portion of pipe comprising:
a continuous helical reinforcing element 7 in its central portion which extends over the outside surface of said wall, making a plurality of turns around the axis XX'. Said continuous helical reinforcing element 7 is constituted by a metal section member that is secured by welding to the surface of said wall. At opposite ends of this continuous helical reinforcing element 7, at the ends of the portion of pipe 1, there are placed annular reinforcing elements 6 made by deforming the pipe wall by forging it from inside the pipe. The helical reinforcing element 7 constituted by a section member fitted to the outside surface of the wall increases the thickness of said wall which means that the radial distance between the outside surface of the pipe at said fitted element and the longitudinal axis XX' is increased compared with the same distance for the tubular running portion of the wall.

FIG. 7 shows how the helical reinforcing element is spiral-wound.

FIG. 8 shows the rectangular section 9 of the section member constituting the helical reinforcing element 7, which element is bonded to the outside face of the pipe 1 by welding. The spiral-wound continuous helical reinforcing element 7 shown in FIG. 6 provides the same stabilizing effect as the above-described annular reinforcing element 6. The spiral-winding pitch or the helical pitch D corresponds to a distance lying in the range 0.5 to 4 diameters, and preferably in the range 2 to 3 diameters. The value of this distance D depends on the diameter of the outer casing, its thickness, and the pressure outside the pipe.

The portion of pipe 1 shown in FIG. 1 corresponds advantageously to a standard unit length available on the market, i.e. about 12 m, and a pipe can then be made by connecting these unit pipe elements together end to end. To make a pipe as shown in FIG. 6, the hoops 6 are initially hot-forged by heating the pipe 1 to red heat and by forming the hoops 6 using an extendable roller wheel tool as described above with reference to FIG. 4. Thereafter, the helical reinforcing element is made like a spring, directly on the casing of the pipe, with the pipe being set into rotation 30 and into translation 31. The helical reinforcing element 7 is preferably formed after being heated to dull red and is then put into place on the pipe merely by synchronizing the rotation 30 and the advance 31 of the tubular casing constituting the pipe 1. The helical reinforcing element 7 is advantageously welded 32, preferably on both sides of the section member, and more preferably continuously.

The method of the invention thus enables unit lengths of pipe to be made with lengths of 12 m, 24 m, or 48 m, or even more, each presenting a helical reinforcing element 7 in the running portion of the pipe element together with one or two annular reinforcing elements obtained by forging at the ends, said hoops 6 then imparting longitudinal flexibility that serves to minimize the forces due to temperature variations within the coaxial PiP assembly when the pipe constitutes the outer pipe of such an assembly 9, which hoops are located at the ends and not in the running portion. In a preferred version of the invention, the lengths of pipe that are reinforced by spiral-winding 7 are made continuously at a dedicated workstation, with the hoops 6 being forged in another workstation. The two types of segment are then connected together end to end by welding at BB and CC to form the unit length shown in FIG. 6. The spiral-wound reinforcement and the fitted hoops are described above as being fitted elements that are bonded by welding or by adhesive, but it remains within the ambit of the invention for the reinforcement to be provided by applying material directly so as to obtain the defined shape, e.g. by using the known technique of in situ buildup in a molten bath, under a flow in a controlled atmosphere, said molten bath being created by an electric arc, a blow torch, or any other appropriate heating means, and the additional metal being compatible with the metal on which the pipe is based.

Figure 19:
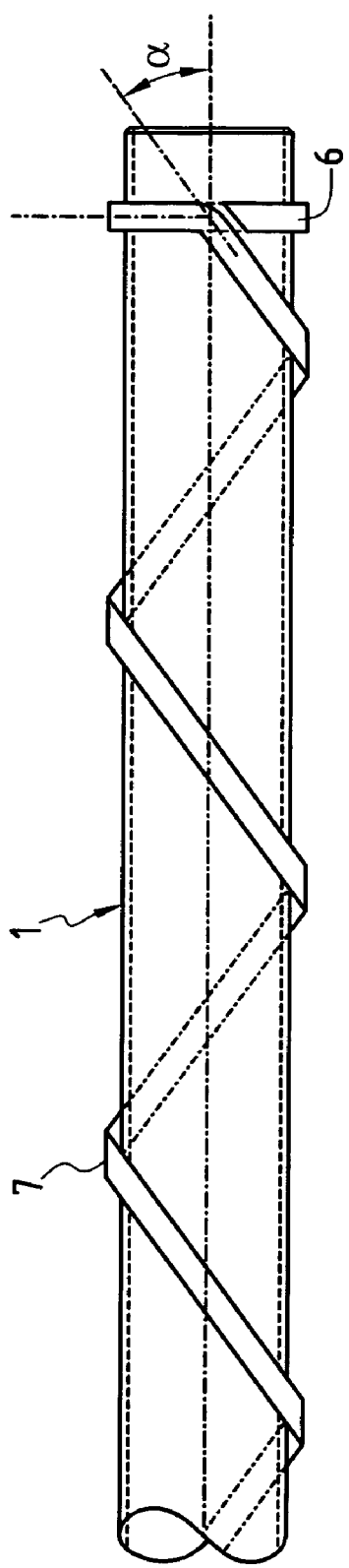
FIG. 19 is a side view of a single unit pipe element with spiral-wound reinforcement having an annular end.

FIG. 19 shows the right-hand end of a unit pipe element 1 of length 24 m, having a spiral-wound reinforcing element 7 welded thereon at a substantially constant angle $\alpha$ over the running length of said pipe element. At the end of the unit pipe element, this angle $\alpha$ is increased so as to reach a value of 90° and thus form an annular reinforcing element 6, with this increase in angle being provided either suddenly merely by deformation as shown in FIG. 19, or else by being varied progressively over one or two revolutions in order to tighten the spiral until substantially touching turns are obtained.

By proceeding in this way, the end of the unit pipe element is released while still providing the needed ability to withstand ambient pressure, thus leaving welders or automatic welding machines with free access to the zone where two successive segments are connected together. In undersea pipes, and more particularly pipes for ultra-great depths, these end-to-end welding operations between two unit pipe elements constitute critical points in the undersea connection since they need to be performed on site under conditions that are difficult and they need to be monitored with very great care in order to ensure that they provide proper service throughout the lifetime of the pipe which can commonly exceed 20 years and more.

The annular termination 6 is preferably situated at a distance from the end of the unit pipe element 1 that lies in the range 0.25 to 1 times the diameter of the pipe, so that its effectiveness is similar to that of fitted rings or rings obtained by deforming the wall of the pipe.

During manufacture of the kind shown in FIGS. 6 and 7, while preferably maintaining a constant speed of rotation, it suffices to vary the speed at which the pipe advances through the winding and welding machine in order to obtain the end configuration, depending on the particular desired spiral configuration which may optionally close up.

In FIG. 19, the substantially circular ring 6 created in this way is also advantageously used as an abutment enabling the pipe to be suspended in the J-laying tower via a retaining collar surrounding said pipe and secured to said laying tower.

The fitted annular reinforcements 6 are described above as being continuously circular elements, but it would remain within the spirit of the invention for two half-shells to be positioned facing each other, or for reinforcements to be annular but split parallel to the axis XX' at one location, the two faces of said split section or the two half-shells being either in contact or else spaced apart from each other by a few millimeters (mm) or even a few cm for large diameters. Said reinforcements act by co-operating with the adjacent material of the tubular pipe so a minimum second moment of area suffices to stabilize said zone of said pipe, and a localized and restricted discontinuity in the reinforcement can thus advantageously be considered without being harmful to the stability of the assembly.

FIGS. 9 and 10 show a pipe bundle 15 constituted by a thermal insulation device comprising:

thermally insulating coating 17 surrounding said undersea pipe(s) 1; and said coating 17 being covered by a leakproof protective casing $16_1$, $16_2$, said casing being tubular in shape and presenting a longitudinal axis of symmetry, and preferably being made of a material that is flexible or semi-rigid so as to be suitable for remaining in contact with the outside surface of said insulating covering 17 when it deforms. These pipe bundles 15 contain pipes 1 that are reinforced with two mutually parallel coaxial helical reinforcing elements $7_1$, $7_2$ disposed symmetrically so as to form zones of extra thickness that are diametrically opposite as shown in FIG. 12. In FIG. 9, the outer casing $16_1$ is made of steel and is rectangular in shape. In FIG. 10, the outer casing $16_2$ is made of thermoplastic material and is circular in shape, with its longitudinal axis XX' coinciding with the axis of the pipe 1. The continuous helical reinforcing elements $7_1$, $7_2$ fitted to the surface of the pipe 1 are constituted by section members of trapezoidal section as shown in FIG. 12. The gap between the pipe 1 and the outer casing $16_1$, $16_2$ is preferably filled with an insulating compound 17 constituted by an insulating material that withstands pressure, for example a phase change material, and more preferably a gel.

FIG. 11 is a longitudinal section view seen from the side showing the bundle 15 of FIG. 10, the internal pipe 11 being reinforced by two spirals $7_1$, $7_2$ having the same pitch, i.e. a helical pitch equal to twice the distance D. Two successive localized zones in the longitudinal direction XX' and corresponding to extra wall thickness $d_2$ are thus spaced apart by a distance D corresponding to half the helical pitch of both of the helices constituting the two symmetrically disposed parallel helical elements $7_1$ and $7_2$.

Figure 13:
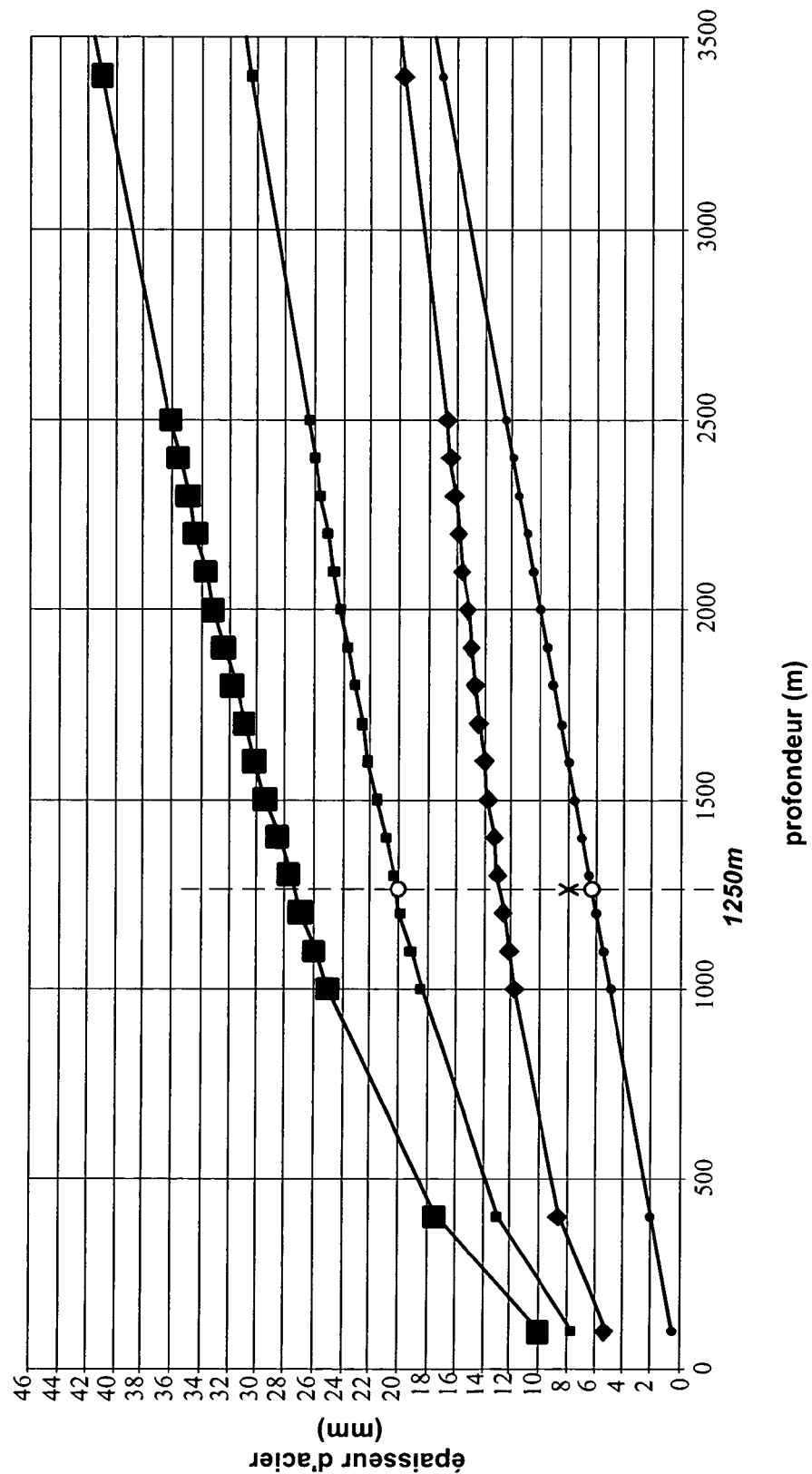
FIG. 13 is a chart showing the wall thickness required by the pipe with and without reinforcement as a function of external pressure, i.e. as a function of depth.

FIG. 13 is a chart showing the thickness needed for the wall of the pipe as a function of external pressure, and thus as a function of depth, with and without reinforcement.

This chart is based on the following elements:

the pipe is made of X-60 grade steel, having an elastic limit of 415 megapascals (MPa) and presents an outside diameter of 16 inches (");

ovalization of the tube is 0.5% $(1-\phi_{max}/\phi_{min})$;

the abscissa axis represents depth of water; and the thickness needed to avoid implosion is plotted up the ordinate axis.

The bottom curve is obtained by a completely utopian theoretical calculation, based on the assumption that there is no instability phenomenon due to external pressure, with the pipe being destroyed under such circumstances only when the elastic limit of the steel is exceeded. In reality, the implosion-initiating buckling phenomenon occurs at a pressure that is much lower, as represented by the three upper curves. These three curves constitute an application of the DNV 2000 (Det Norske Veritas) building rules relating to dimensioning undersea pipes. The bottom curve represents the calculated theoretical value of wall thickness needed to avoid buckling appearing at a random point of the pipe presenting given ovalization. The top curve represents the theoretical thickness needed to avoid a collapse propagating between two buckle arrestors. It is the usual practice to take a mean value between these two curves as represented by the intermediate curve.

The devices described in this invention enable the thickness needed to avoid implosion to be reduced significantly by coming closer to the "utopian" curve. By way of example, for the above-described pipe, at a water depth of 1250 m, the "utopian" thickness is about 6 mm, whereas the thickness required by the regulation is 20 mm.

For the same depth of water, the pipe of the invention needs a wall thickness of 8 mm associated with hoops 6 that are regularly spaced apart by one diameter (16", or 40.64 cm), either on their own or in combination with a spiral-wound reinforcing element 7 having the same pitch of about 40 cm, said spiral-wound reinforcing element 7 being constituted by a steel flat of 25 mm×25 mm section continuously welded via two opposite sides to the outside of said pipe.

The saving of material is considerable, but the real advantage of the invention lies in the fact that the pipe is much lighter in weight and can therefore be laid using a J-laying tower of the kind shown in FIG. 1 which is much less powerful than would otherwise be required.

The tension that can be supported by presently available handling equipment for laying in ultra-great depths is about 400 t to 600 t, and a few units are now capable of achieving 1000 t to 1200 t. Reinforced pipes made in accordance with the invention thus enable presently existing J-laying towers to reach depths that are much greater than that those which are presently technically feasible.

FIG. 14 is a side view of a thick pipe capable on its own of withstanding bottom pressure.

FIG. 15 shows an arbitrary segment of length L of said pipe. This portion is stable under pressure forces since the longitudinal second moment of area of its section associated with the pipe curving in the perpendicular direction is sufficient to avoid said curvature inverting 8a-8b as shown in FIG. 3.

FIG. 16 shows a stable portion of length L of a pipe of reduced wall thickness that is unstable in the running portion of its length, but that is locally reinforced by a hoop obtained by outwardly expanding its wall from the inside. The greater longitudinal section of length L including said hoop then possesses, in association with the curvature of the pipe in the perpendicular plane, a second moment of area that is sufficient to withstand overall any inversion of curvature as shown in FIG. 3, which phenomenon is the precursor of implosion. Experiment and calculation show that the length L is a function of diameter, of wall thickness and variations in wall thickness, of ovalizing defects, and of steel quality, and it lies in the range 0.5 to 2 times the diameter of said pipe.

Thus, by juxtaposing reinforcements that are spaced apart by a distance D=L, each reinforcement has a stabilizing effect over a length L/2 upstream and a length L/2 downstream.

FIG. 17 shows the effect of welded spiral-wound reinforcement, with the section shown being stabilized over a length L in the longitudinal direction XX', said stabilization being repeated all along the spiral over the same length L of the wall of said pipe.

FIG. 18 shows localized reinforcement constituted by necks as in the prior art. In order to obtain an available inside diameter identical to that shown in FIGS. 14 to 17, the running portion of the pipe needs to be of diameter greater than that required by a pipe of the invention, and thus requires considerably greater wall thickness in order to withstand the same pressure conditions, the geometrical characteristics of the necks and the other parameters associated with the pipe remaining substantially the same. Devices of the invention thus provide a saving in material, and thus a significant reduction in cost, and in addition they reduce the power requirements of laying equipment for laying pipes in ultra-great depths.

The invention is described above on the basis of steel pipes reinforced to withstand implosion, however the same technique also applies advantageously to pipes made of composite materials, being built up of filamentary windings of glass fibers, synthetic fibers, or carbon fibers in a matrix of epoxy, polyester, etc. With spiral-wound reinforcement, and also with applied continuous circular reinforcement, the reinforcement can then be integrated with the pipe during the manufacturing process, or else it can be fitted onto and bonded to said pipe, e.g. by adhesive.

The invention claimed is:

1. An undersea coaxial assembly of two pipes suitable for being laid empty and to rest on the seabed at depths in excess of 1000 m, comprising an outer pipe containing an inner pipe suitable for transporting fluids, the two pipes being interconnected by centralizing mechanical connections with a space between said inner pipe and said outer pipe,
   wherein said outer pipe comprises:
   a tubular wall having at least one external peripheral reinforcing element creating a plurality of localized zones on the outside surface of said tubular wall, the radial distance between the outside surface of the outer pipe and the longitudinal axis of said tubular wall in said localized zones being greater than the outside radius of tubular wall portions lying between said localized zones in a longitudinal direction, two successive ones of said localized zones being spaced apart in said longitudinal direction of said tubular wall by a distance equal to ½ to 4 times the outside diameter of said tubular wall portions, said successive localized zones being spaced apart regularly.

2. The undersea coaxial assembly of two pipes according to claim 1, wherein said at least one external peripheral reinforcing element comprises at least one of a reinforcing element that is discontinuous such that said localized zones in said longitudinal direction are created by distinct discontinuous reinforcing elements; and a reinforcing element that is continuous such that each continuous reinforcing element comprises at least two of said localized zones in said longitudinal direction.

3. The undersea coaxial assembly of two pipes according to claim 1, wherein the increase in said radial distance between the outside surface of the pipe and the longitudinal axis of said tubular wall is equal to ½ to 5 times the thickness of said tubular wall in its running portion.

4. The undersea coaxial assembly of two pipes according to claim 1, wherein said tubular wall comprises a plurality of annular discontinuous reinforcing elements each forming one of said localized zones corresponding to an increase of the outside diameter of said pipe at said annular reinforcing elements.

5. The undersea coaxial assembly of two pipes according to claim 1, wherein said tubular wall comprises at least one continuous helical reinforcing element forming at least a portion of a helical curve having the same longitudinal axis as said tubular wall.

6. The undersea coaxial assembly of two pipes according to claim 1, wherein said tubular wall comprises at least one continuous helical reinforcing element extending on the outside surface of said tubular wall, making a plurality of turns thereabout.

7. The undersea coaxial assembly of two pipes according to claim 1, wherein said tubular wall comprises a plurality of coaxial helical reinforcing elements that are mutually parallel such that the plurality of coaxial helical reinforcing elements constitute respective ones of said localized zones.

8. The undersea coaxial assembly of two pipes according to claim 1, wherein each localized zone corresponding to an increase of said radial distance relative to said longitudinal axis extends in said longitudinal direction over a length l that is 2 to 10 times the thickness of the tubular wall in its tubular portions.

9. The undersea coaxial assembly of two pipes according to claim 1, wherein said reinforcing elements comprise section members fitted onto the outside surface of said tubular wall, thereby creating extra thickness of said tubular wall in said localized zones.

10. The undersea coaxial assembly of two pipes according to claim 9, wherein said section members are metal section members welded to the outside surface of said tubular wall.

11. The undersea coaxial assembly of two pipes to claim 9, wherein a section of said section member is one of a rectangular and a trapezoidal shape.

12. The undersea coaxial assembly of two pipes according to claim 1, wherein said discontinuous reinforcing element is made by deformations that emboss said tubular wall.

13. The undersea coaxial assembly of two pipes according to claim 12, wherein said deformation is performed by forging the tubular wall from the inside of said outer pipe.

14. The undersea coaxial assembly of two pipes according to claim 1, further comprising:
   at least one continuous helical reinforcing element disposed in a central portion of the pipe; and
   at least one annular reinforcing element that is discontinuously situated between at least one end of said pipe and said continuous helical reinforcing element.

15. The undersea coaxial assembly of two pipes according to claim 14, wherein:
   each annular reinforcing element is made by deforming said tubular wall by forging said tubular wall; and
   said continuous helical reinforcing element is a section member fitted to the surface of said tubular wall.

16. The undersea coaxial assembly of two pipes according to claim 14, wherein said continuous helical reinforcing element causes at least one end to terminate in said discontinuous annular reinforcing element.

17. The undersea coaxial assembly of two pipes according to claim 16, wherein said continuous helical reinforcing element comprises a section member fitted to the surface of said tubular wall and causes at least one end to terminate in an annular reinforcing element extending continuously from said helical reinforcing element, and said annular reinforcing element comprising the end of said section member of said helical reinforcing element.

18. The undersea coaxial assembly of two pipes according to claim 1, wherein a space between said inner and outer pipes contains an insulating material.

19. A pipe bundle comprising:
   an undersea coaxial assembly of two pipes according to claim 1;
   a device for thermally insulating said undersea coaxial assembly of two pipes; and
   a thermal insulation covering surrounding said undersea coaxial assembly of two pipes;
   wherein said covering itself is covered in a leakproof protective casing, said casing being tubular in shape and having a longitudinal axis of symmetry and comprising a material that is semi-rigid and adapted to remain in contact with the outside surface of said insulating covering when the material deforms.

20. A reinforced undersea unit pipe element suitable for transporting fluids flowing out in said pipe and suitable for being laid empty and to rest on the seabed at depths in excess of 1000 m, the reinforced undersea unit pipe element comprising:
   a tubular wall comprising:
      at least one external peripheral reinforcing element creating a plurality of localized zones on the outside surface of said tubular wall, the radial distance between the outside surface of the pipe and the longitudinal axis of said tubular wall in said localized zones being greater than the outside radius of tubular wall portions lying between said localized zones in a longitudinal direction, two successive ones of said localized zones being spaced apart in said longitudinal direction of said tubular wall by a distance equal to ½ to 4 times the outside diameter of said tubular wall portions, said successive localized zones being spaced apart regularly; and
      at least two coaxial helical reinforcing elements that are mutually parallel such that the at least two coaxial helical reinforcing elements constitute respective ones of said localized zones that are diametrically opposite about the axis of said tubular wall, respectively on each of said two helical elements.

21. A reinforced undersea unit pipe element suitable for transporting fluids flowing out in said pipe and suitable for being laid empty and to rest on the seabed at depths in excess of 1000 m, the reinforced undersea unit pipe element comprising:
   a tubular wall comprising at least one external peripheral reinforcing element creating a plurality of localized zones on the outside surface of said tubular wall, the radial distance between the outside surface of the pipe and the longitudinal axis of said tubular wall in said localized zones being greater than the outside radius of tubular wall portions lying between said localized zones in a longitudinal direction, two successive ones of said localized zones being spaced apart in said longitudinal direction of said tubular wall by a distance equal to ½ to 4 times the outside diameter of said tubular wall portions, said successive localized zones being spaced apart regularly;
   at least one continuous helical reinforcing element disposed in a central portion of the pipe; and
   at least one annular reinforcing element that is discontinuously situated between at least one end of said pipe and said continuous helical reinforcing element.

22. A pipe bundle comprising:
   an undersea coaxial assembly of two coaxial pipes according to claim 1;
   a device for thermally insulating said undersea coaxial pipes; and
   a thermal insulation covering surrounding said undersea coaxial pipes;
   wherein said covering itself is covered in a leakproof protective casing, said casing being tubular in shape and having a longitudinal axis of symmetry and comprising a material that is semi-rigid and adapted to remain in contact with the outside surface of said insulating covering when the material deforms.

\* \* \* \* \*